Nov. 27, 1934.    F. W. DUNMORE    1,981,857
DEVIOMETER
Filed April 12, 1932    2 Sheets-Sheet 1
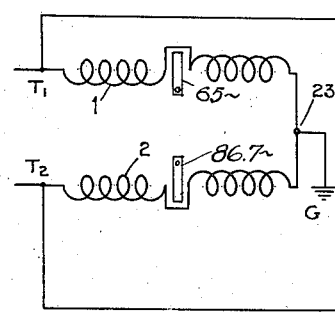
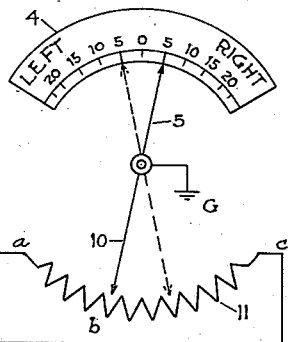
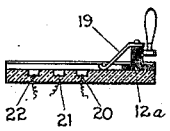
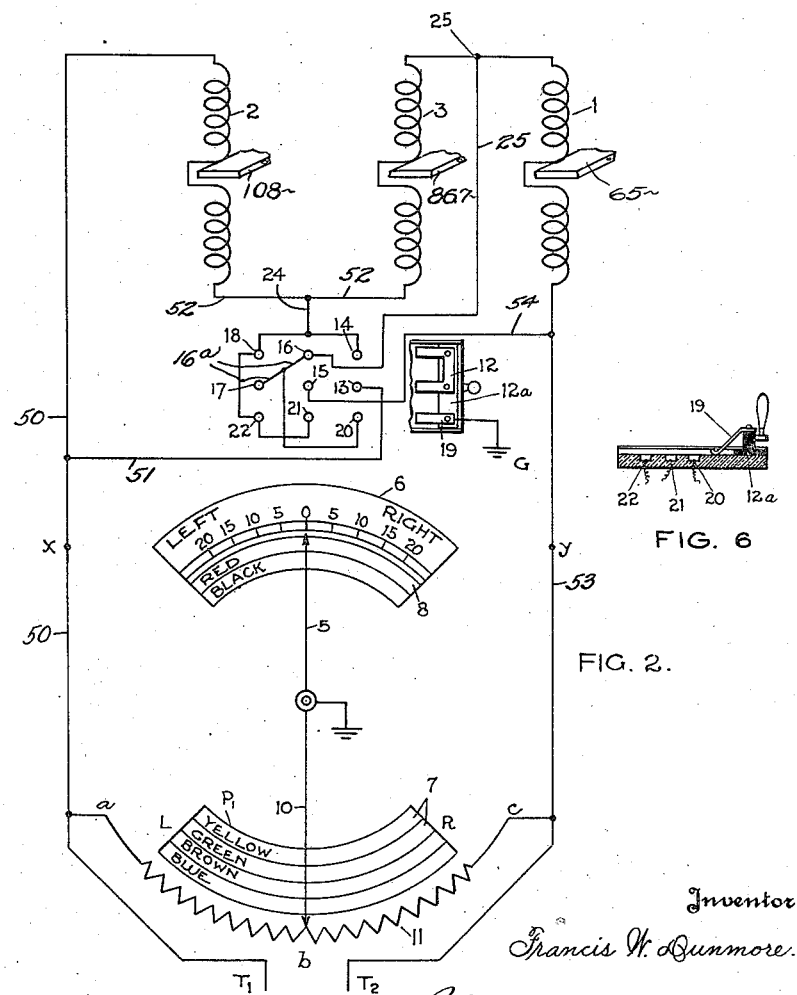
Inventor
Francis W. Dunmore.
By J. Mothershead
Attorney Nov. 27, 1934.  F. W. DUNMORE  1,981,857
DEVIOMETER
Filed April 12, 1932  2 Sheets-Sheet 2

Inventor
Francis W. Dunmore.
By J. F. Mothershead
Attorney

Patented Nov. 27, 1934

1,981,857

UNITED STATES PATENT OFFICE 1,981,857

DEVIOMETER

Francis W. Dunmore, Washington, D. C., assignor to the Government of the United States as represented by the Secretary of Commerce Application April 12, 1932, Serial No. 604,853

3 Claims. (Cl. 177—352)

(Granted under the act of March 3, 1883, as amended April 30, 1928; 370 O. G. 757)

The invention described herein may be manufactured and used by or for the Government of the United States for governmental purposes only without the payment of any royalty thereon.

This invention relates to improvements in radio beacon course indicating methods and apparatus and more particularly to course indicating methods and apparatus for use on mobile objects.

Various known methods and apparatus for shifting the courses of the double-modulation directive radio beacon, so that these courses may be aligned with the airway routes converging upon the airport at which the beacon is located, have been found to require certain adjustments at the beacon transmitting station. Since considerable time and delay are involved during each readjustment of the radio beacon courses at stations where a number of air routes converge, it is customary to maintain the courses in permanent alignment with the fixed airway routes.

A pilot operating over a route between two airports sometimes finds it advantageous to fly along a line other than the equisignal line or zone set up by the beacon. For example, during a flight he may receive information of an approaching storm and in order to avoid the storm area, he may wish to deviate considerably to the right or left. Moreover, on a congested radio-served airway, the possibility of head-on collisions due to traffic in both directions will be eliminated if all pilots follow a course, say, 2° to the right of the equisignal beacon courses. Furthermore, for operation over a route between two airports, one of which has a radio range-beacon, but the other lying from, say, 1 to 15 degrees to the right or left of the radio-served airway, it is desirable to lay out a new beacon course along this route as an aid to navigation during times of poor visibility.

An object of the present invention is the provision of methods and apparatus by means of which the above-mentioned courses can be obtained conveniently and without delay.

Another object is the provision of course shifting methods and apparatus installed on the airplane whereby the pilot can lay out new courses, within certain limits, by shunting a variable resistance across each driving coil actuating a vibrating reed, galvanometer, or any other device comprising the course indicator.

Still another object is the provision of a color system used in conjunction with the variable resistance and properly prepared colored airway maps whereby a pilot can lay out new beacon courses along any course emanating from the four and twelve-course radio beacons.

The invention, hereinafter referred to as a "deviometer", is described more in detail in the following specification which is accompanied with drawings in which:

Figure 1 is the schematic diagram for the deviometer used with the four-course double-modulation directive radio beacon.

Figure 2 is the schematic diagram and color system for the deviometer used with the twelve-course double modulation directive radio beacon.

Figure 6 is a side view, partly in section, of one form of my selective short circuiting member.

Figure 3:
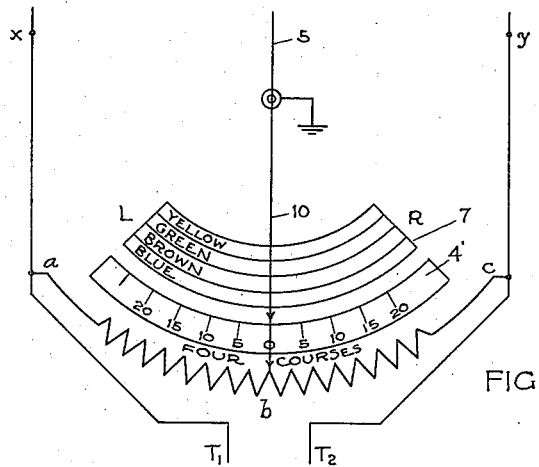
Figure 3 is the schematic diagram and color system for the deviometer used with either the four or twelve-course double-modulation directive radio beacon.

Referring more in detail to the accompanying drawings, in which like reference characters designate like parts, the numerals 1 and 2 (Figure 1) denote the driving coils for the 65-cycle and 86.7-cycle reeds, respectively. 4 denotes the deviometer scale used in connection with the movable pointer 5 to indicate the deviation from the equisignal line or zone during a flight along a radio beacon course emanating from a four-course beacon. 10 denotes the sliding contact attached to the movable pointer 5 and in conductive relation with the resistance 11 at the movable point $b$. $T_1$ and $T_2$ denote the terminals attached to the output of the radio receiver. G denotes the ground connections.

In Figure 2, the numerals 1, 2, and 3 denote the driving coils for the 65-cycle, the 86.7-cycle, and the 108.3-cycle reeds, respectively. 6 denotes the deviometer scale for indicating the deviation from the equisignal line or zone. A plurality of colored arcs which are indicated by 7 and 8 together with airway maps on which each airway is assigned a distinguishing color and the pointer 5 are used to identify a desired course.

A sliding contact 10 is attached to the movable pointer 5 and is in conductive relation with a resistance 11 at the point $b$.

A selective switch, the parts of which are indicated by the numerals 12 to 22 Figs. 2 and 6 serves as a means for at will picking out the coils 2 and 3; or 2 and 1; or 3 and 1; and connecting them to the terminals $T_1$ and $T_2$ while also grounding the common connection between them.

In this switch comprising a sliding insulating block 12a having a U-shaped member thereto fixed so that the free ends of the U serve as sliding contacts for connecting the three pairs of terminals (13—14) (15—16), and (17—18), successively. A sliding contact 19 is also mounted on the block 12a at one side of the member 12 is used for connecting the terminals 20; 21 and 22 to a ground, simultaneously with the connecting of the terminals 13 with 14 or 15 with 16 or 17 with 18, respectively. $T_1$ and $T_2$ denote terminals attached to the output terminals of a radio receiver while a common ground is denoted by G.

For each of the three positions of switch 12a in Fig. 2 the circuit is as follows: In the first position of switch movable contact 12a, when it is moved from the full line position shown in Figure 2, the contactor 12 connects contacts 13 and 14 together, and 19 grounds 20. Coils 2 are shortcircuited connecting terminal $T_1$ through conductors 50 and 51, contacts 13 and 14, conductors 24 and 52, to the lower end of coils 3, the upper end being grounded through conductors 25, contact 16, conductor 16a, contacts 20 and 19. The upper end of coils 1 is also grounded in the same manner through contacts 20 and 19, the lower end coils 1 being directly connected to terminal $T_2$. Thus the common point between coils 3 and 1 is grounded, the two remaining ends of coils 3 and 1 being connected to the input terminals $T_1$ and $T_2$. As coil 3 operates the 108.3-cycle reed and coil 1 the 65-cycle reed, these two reeds function with this position of switch 12—19—12a, with the deviometer resistance 11 across their input terminals.

In the second position of switch movable contactor 12a, the contact 12 thereof connects terminals 15 and 16 together thus shortcircuiting coils 1 and connecting the upper end of coils 3, through conductors 53, 54 and 25, to terminal $T_2$. Contact 19 connects terminal 21 to ground G thus grounding the common connection 52 and 24 between coils 2 and 3. The other terminal of coils 2 is connected to terminal $T_1$ through conductor 50. As coils 2 operate the 86⅔-cycle reed and coils 3 the 108.3-cycle reed, these two reeds will function with this position of switch 12—19—12a with the deviometer resistance 11 across their input terminals.

In the third position of switch movable contactor 12a, the contact 12 thereof connects terminals 17 and 18 together, thus shortcircuiting coils 3. Contact 19 connects terminal 22 to ground G, thus grounding the common connection (shorted coils 3) between coils 2 and 1, to ground G. The other terminal of coils 2 is connected to terminal $T_1$ and the other terminal of coils 1 is connected to terminal $T_2$. As coils 2 operate the 86⅔-cycle reed and coils 1 the 65-cycle reed, these two reeds will function with this position of switch 12—19—12a with the deviometer resistance 11 across their input terminals.

Referring to Figure 3, the circuit arrangements, the color scheme used for identifying the courses, and the numerals indicating the corresponding parts thereof are identical to those employed in Figure 2. However, an additional scale 4' is shown, Figure 3, to enable a pilot to use the deviometer in connection with any course emanating from either a four-course or twelve-course radio beacon.

Figure 4:
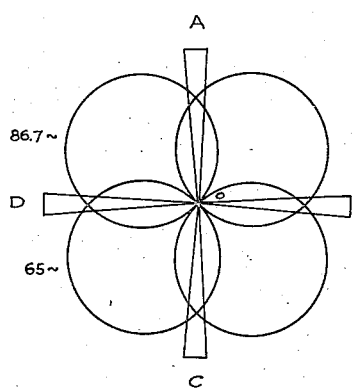
Figures 4 and 5 show the radiated space pattern of a four-course and a twelve-course radio beacon, respectively.

Figure 4 shows the two figure-of-eight radiated space patterns of the four-course radio beacon, modulated to 65-cycles and 86.7 cycles, respectively. The equisignal zones are indicated by the colored sectors OA, OB, OC, and OD.

Figure 5:
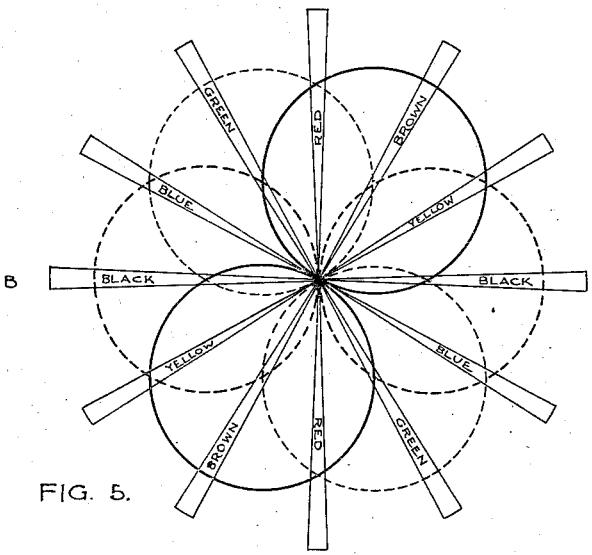

Figure 5 shows the three figure-of-eight radiated space patterns of the twelve-course radio beacon modulated to 65 cycles, 86.7 cycles, and 108.3 cycles, respectively. The equisignal zones lie along the colored sectors.

With this setting, the operation of my invention will now be explained, though it will be understood that the invention is not, in its broader aspects, limited to any particular arrangement of apparatus and circuits.

Consider a flight towards the radio beacon located at O along the black course DO (Figure 4), the reed indicator unit is mounted so that the 65-cycle reed is on the pilot's right, the side of the greater 65-cycle modulation, and the 86.7-cycle reed is on his left, the side of the greater 86.7-cycle modulation. In this way, longest reed shows side off course. Now suppose he wishes to deviate five degrees to the right, he shifts the movable pointer 5 to the right as indicated in the diagram (Figure 1). While the pointer 5 is moving towards the right, the sliding contact 10 attached thereto slides along the resistor ac, so as to decrease the part of the resistor ab and increase the part bc. Since ab and bc are the resistors shunted across the driving coils of the 65-cycle and the 86.7-cycle reeds, respectively, more current is shunted around the 65-cycle driving coil than around the 86.7-cycle driving coil, and consequently the amplitude of vibration of the 65-cycle reed is less than that of the 86.7-cycle reed.

To compensate for the greater loss in the driving coil for the 65-cycle reed, the pilot, adhering to the rule (longest reed shows side off course—turn to the shorter reed), turns towards the shorter reed which is on his right; that is, away from the radiation pattern modulated to 86.7 cycles and towards the radiation pattern modulated to 65 cycles. This relative change in field strength will again yield equal amplitudes of vibration when the desired course is reached. A further shift to the right would produce a greater amplitude of vibration of the 65-cycle reed than the 86.7-cycle reed.

If he wishes to deviate five degrees to the left of the course DO, the pointer 5 is moved to the left as indicated by the dash line in Figure 1. While the pointer 5 is moving towards the left, the sliding contact 10 moves toward the right, increasing the part of the resistor ab and decreasing the part bc. It will be observed that the new setting shunts more current around the 86.7-cycle coil and less around the 65-cycle coil. The amplitude of vibration of the 86.7 cycle reed is, therefore, less than the amplitude of vibration of the 65-cycle reed. To compensate for the greater loss in the driving coil for the 86.7-cycle reed, the pilot turns towards the shorter reed which is on his left; i. e., away from the radiation pattern modulated to 65-cycles and toward the radiation pattern modulated to 86.7 cycles. Equal amplitude of vibration of the reeds is again attained when the desired course is reached.

Should the pilot make a 180° turn and fly from the radio beacon, the location of the zones of greatest 65 and 86.7-cycle modulation reverses with respect to his right and left. This is also true if he passes over the radio beacon and flies along the course OB away from the beacon. It is, therefore, necessary to turn the reed unit upside down in order to reverse the reed locations in accordance with the reversal of the zones of modulation with respect to the pilot's right and left. Reversing the reeds also reverses the terminals $x$ and $y$ so that the resistor $ab$ now shunts current around the 86.7-cycle coil and $bc$ shunts current around the 65-cycle coil.

If the pilot now wishes to deviate to the right, he again moves the pointer towards the right as shown in Figure 1, thereby shunting more current around the 86.7-cycle coil and less around the 65-cycle coil. The amplitude of vibration of the 86.7-cycle reed is, therefore, less than the amplitude of vibration of the 65-cycle reed. To compensate for the greater loss in the driving coil for the 86.7-cycle reed, the pilot turns towards the shorter reed which is on his right. Equal amplitude of vibration of the reeds is again attained when the desired course is reached. Likewise courses can be laid along the red courses.

When a pilot wishes to fly along a course emanating from the twelve-course radio beacon, the three-reed indicator unit and the deviometer shown in Figure 2 are used. The color of the course indicated on the airway map (Figure 5) is noted and the direction of flight along the course. If he wishes to fly a red course away from the beacon, he inserts the reed indicator unit in the mounting in the usual way and short circuits the driving coil of the reed not used for the course, say, coil 3 which is the driving coil for the 108.3-cycle reed. This is accomplished by short circuiting the terminals 17 and 18 by means of the short-circuiting member 12. The shunting resistors $ab$ and $bc$ are then placed across the driving coils of the reeds used, 1 and 2, the coils for the 65-cycle and 86.7-coil respectively, by connecting the terminal 22 to ground by means of the sliding contact 19.

If the new course desired is on the right of the equisignal line, he moves the end of the pointer 5 which is over the correct color of the color scale (red in this case) to the right. Since this motion also increases the current through the driving coil of the reed on the pilot's right and decreases the current through the driving coil of the reed on the left, the amplitude of vibration of the reed on the right is less than the amplitude of vibration of the reed on the left. When using a 12 course reed indicator and flying on a red course from the beacon, although the 65-cycle driving coil is to the right of the 86.7-driving coil, the 65-cycle reed tip as seen by the pilot is on the left of the 86.7-cycle reed as the 65-cycle reed has two white tabs on it. However, as the airplane is deviating towards the right, the difference in the amplitude of vibration gradually decreases until the two reeds again have the same amplitude of vibration which shows him that the new course is reached.

Should the pilot wish to make a 180° turn and fly towards the beacon, the location of the zones of greatest 86.7 and 65-cycle modulation reverses with respect to his right and left. It is, therefore, necessary to turn the reed unit upside down in order to reverse the reed locations in accordance with the reversal of the zones of modulation with respect to the pilot's right and left. Reversing the reeds also reverses the terminals $x'$ and $y'$ so that the resistor $ab$ now shunts current around the 65-cycle coil and $bc$ shunts current around the 86.7-cycle coil. If the pilot now wishes to deviate to the right, he again moves the pointer 5 to the right, thereby shunting more current from the 65-cycle coil and less around the 86.7-cycle coil. The amplitude of vibration of the 65-cycle reed is, therefore, less than the amplitude of vibration of the 86.7-cycle reed. Equal amplitude of vibration of the reeds is again attained when the desired course on the right is reached. Likewise, courses can be laid along the black equisignal zones by mounting the reed indicator unit so that the 86.7-cycle reed is on the side of the zone of greatest 86.7-cycle modulation and the 65-cycle reed is on the side of the zone of greatest 65-cycle modulation.

If he now wishes to fly along a yellow course away from the beacon, he mounts the reed unit in the usual manner and short circuits the driving coil not used for the course, say, coil 1, which is the driving coil for the 65-cycle reed. This is accomplished by short circuiting the terminals 15 and 16 by means of 12. The shunting resistors $ab$ and $bc$ are then placed across the driving coils 2 and 3, of the reeds used, by connecting the terminal 21 to ground by means of the sliding contact 19.

If he wishes to fly to the right, he moves the end of the double pointer 5 over the yellow color scale to the right. Since this motion also decreases the shunt resistor across the driving coil of the reed on the pilot's right and increases the shunt resistor across the driving coil of the reed on the left, the amplitude of vibration of the reed on the right is less than the amplitude of vibration of the reed on the left.

Equal amplitude of vibration of the reeds is again attained by deviating to the right until the new course is reached. Likewise new courses can be laid along the green courses by mounting the reed indicator unit in the proper manner.

To lay new courses along the brown and blue equisignal, the driving coil 2 of the reed not used (the 86.7-cycle coil) is short circuited by connecting the terminals 13 and 14 by means of the short-circuiting block 12. The shunting resistances $ab$ and $bc$ are then placed across the driving coils 1 and 3 of the reeds used, by connecting the terminal 20 to 10 by means of the sliding contact 19. The details of operation for obtaining any desired course are similar to those required for laying new courses along the green and yellow equisignal zones.

In Figure 3 the color scheme and four-course scale on the face of the deviometer are so arranged that the four-course and twelve-course reed indicator units can be used interchangeably. If the pilot wishes to lay a new course along any course emanating from a twelve-course radio beacon, the twelve-course reed indicator unit is mounted in the usual way and the new course is located by the same method described in connection with Figure 2.

If a new course is established along a course emanating from a four-course radio beacon, the four-course reed indicator unit is mounted in the usual way and the right or left deviation from the main course is determined by means of the four-course graduated scale shown at the lower end of the movable pointer 5.

While I have described my invention as applied to the reed indicator, it is also applicable to the reed converter. I also desire that it be understood that modifications may be made and that no limitations upon my invention are intended by the appended claims, other than those which may be incorporated in the claims as allowed.

What I claim is:—

1. In a radio receiving system for aircraft beacon signals having a plurality of different modulation frequencies, the combination of a radio receiving set having two output terminals, a resistance connected across said output terminals; a variable contact for said resistance; more than two vibrating reeds, each reed having associated driving coils all connected in series across said resistor and designed to respond to a different one of said beacon modulation frequencies; switching means associated with the terminals of said resistor, the variable contact of said resistor, said driving coils and said output terminals of said receiving set for connecting, in series across said resistor, any set of driving coils associated with one reed to any set of driving coils associated with any other reed, and connecting the common connection between these two sets of driving coils to said variable contact and short circuiting the remaining driving coils.

2. In a deviometer the combination of an input circuit comprising a resistor, a variable tap on said resistor, a plurality of reeds having different periods of vibration, driving coils associated with each of said reeds, said coils all being connected in series across said resistor, switching means associated with said resistor, said variable tap and said driving coils for connecting, in series across said resistor, any set of driving coils associated with one reed to any set of driving coils associated with any other reed and connecting the common connection between these two sets of driving coils to said variable tap on said resistor and short-circuiting the remaining driving coils.

3. In a deviometer the combination of an input circuit comprising a resistor having a variable tap, a plurality of reeds having different periods of vibration, driving coils associated with each reed, all of said coils being connected in series across said resistor, switching means for connecting any set of driving coils associated with one reed in shunt with the part of said resistor on one side of said variable tap and any set of driving coils associated with any other reed in shunt with the part of said resistor on the other side of said variable tap and short-circuiting the remaining series driving coils.

FRANCIS W. DUNMORE.